No. 731,478. PATENTED JUNE 23, 1903.
F. P. LIVINGSTON.
BRAKE RIGGING FOR SIX WHEELED TRUCKS.
APPLICATION FILED OCT. 18, 1902.
NO MODEL. 2 SHEETS—SHEET 1.
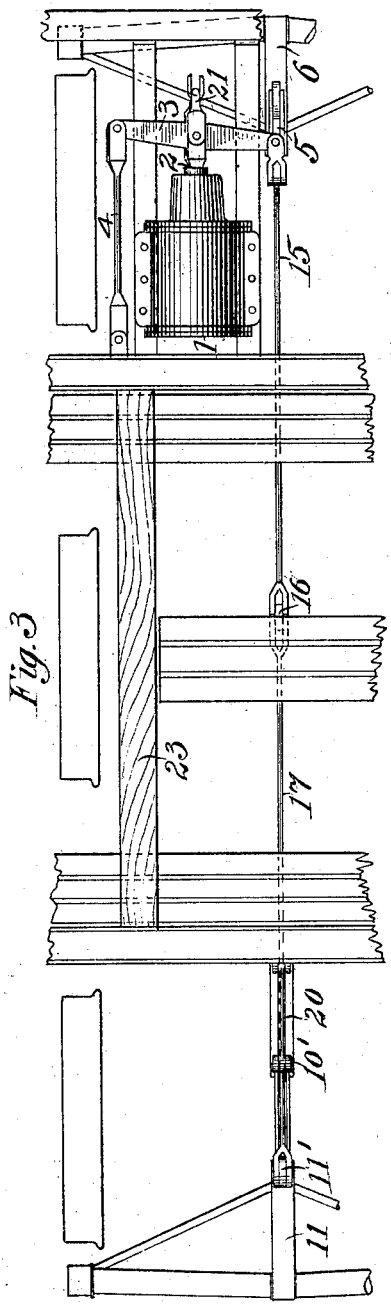
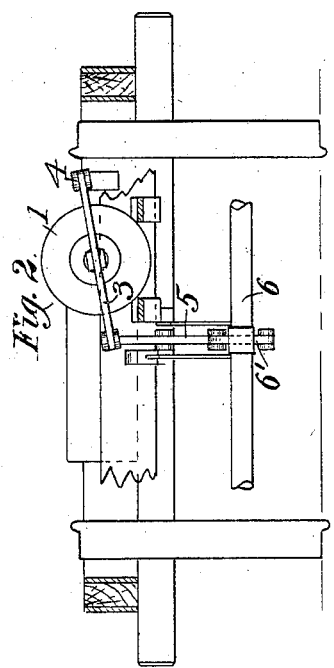
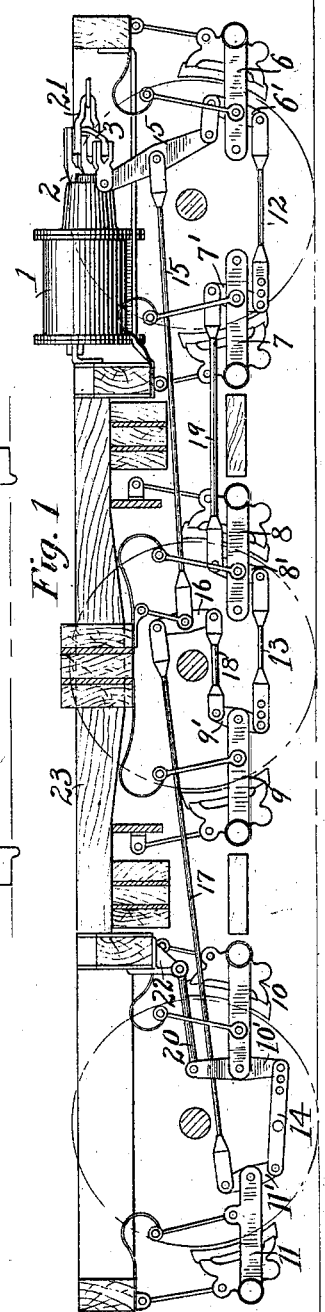
WITNESSES:
INVENTOR,
Fremont P. Livingston
By E. Wright
Att'y.

No. 731,478. PATENTED JUNE 23, 1903.
F. P. LIVINGSTON.
BRAKE RIGGING FOR SIX WHEELED TRUCKS.
APPLICATION FILED OCT. 18, 1902.
NO MODEL. 2 SHEETS—SHEET 2.
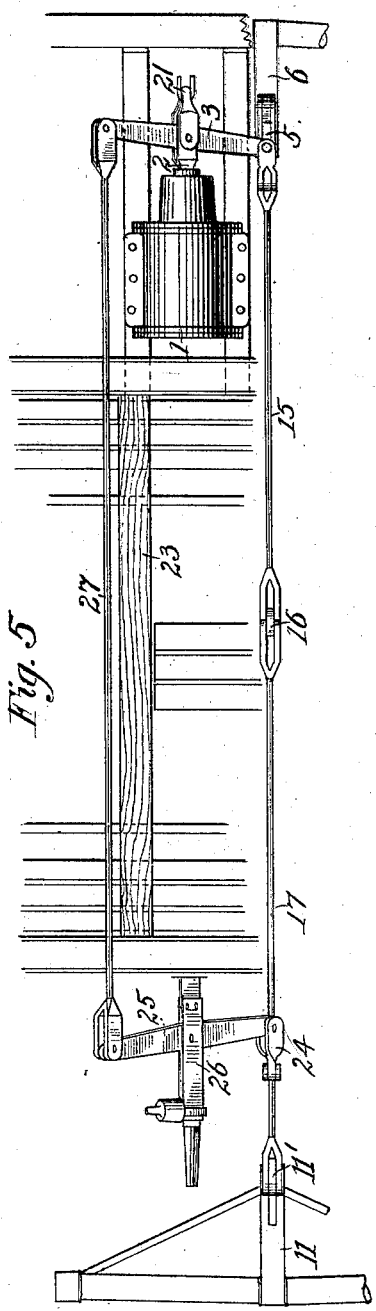
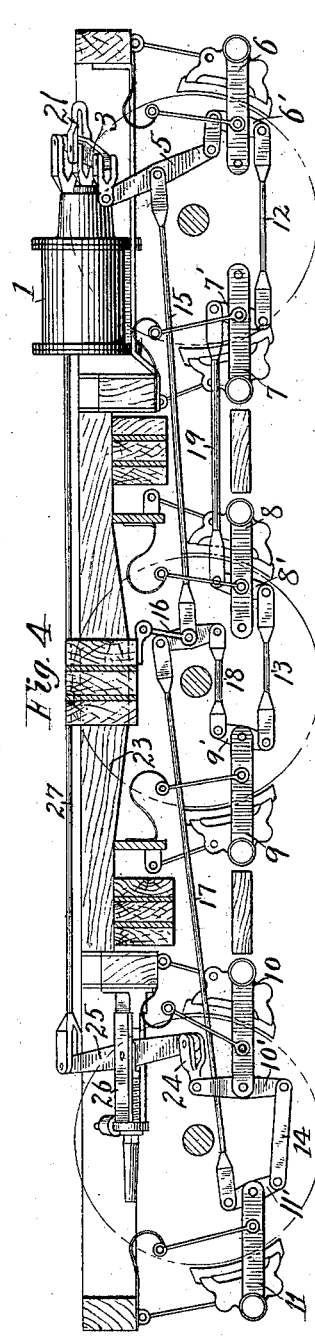
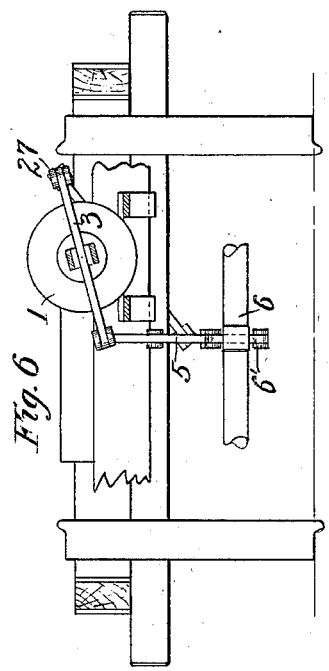
WITNESSES:
INVENTOR,
Fremont P. Livingston
By E. Wright
Att'y.

No. 731,478. Patented June 23, 1903.

UNITED STATES PATENT OFFICE.

FREMONT P. LIVINGSTON, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

BRAKE-RIGGING FOR SIX-WHEELED TRUCKS.

SPECIFICATION forming part of Letters Patent No. 731,478, dated June 23, 1903.

Application filed October 18, 1902. Serial No. 127,807. (No model.)

*To all whom it may concern:*

Be it known that I, FREMONT P. LIVINGSTON, a citizen of the United States, residing in Wilkinsburg, in the county of Allegheny and State of Pennsylvania, have invented a certain new and useful Improvement in Brake-Rigging for Six-Wheeled Trucks, of which improvement the following is a specification.

My invention relates to brake-rigging for railway-cars, and has for its object to provide an improved brake-rigging especially adapted for six-wheeled trucks and having brake-shoes applied to both sides of each pair of wheels, the arrangement being such as to equalize the strains throughout the system and relieve the axle-bearings of lateral pressure due to braking strains.

With this and other objects in view my invention consists in certain novel combinations and improved construction, all as hereinafter more fully described, and set forth in the claims.

In the accompanying drawings, Figure 1 is a vertical longitudinal section of a six-wheeled truck, showing my improved form of brake-rigging applied thereto; Fig. 2, an end view; Fig. 3, a plan view, a portion of the truck-frame being broken away; Fig. 4, a view similar to Fig. 1, but showing a slight modification; Fig. 5, a plan view of the modified form shown in Fig. 4, and Fig. 6 an end view of the same.

According to the construction shown in the drawings the brake-cylinder 1 is mounted on the truck-frame, the piston-rod 2 being pivotally connected with lever 3, one end of which is attached to the truck-frame by means of rod 4, while the other end is pivotally connected to equalizing-lever 5. Brake-beams 6, 7, 8, 9, 10, and 11, provided with the usual hangers, are suspended from the truck-frame and arranged as shown, so as to bear on both sides of each pair of wheels. On the brake-beams are pivotally mounted the respective levers 6', 7', 8', 9', 10', and 11', the lower ends of levers 6' and 7', levers 8' and 9', and levers 10' and 11' being connected by rods 12, 13, and 14, respectively. A pull-rod 15 connects the equalizing-lever 5 with another equalizing-lever 16, the upper end of which is connected to the upper end of lever 11' by a pull-rod 17, while the lower end is connected to lever 9' by a rod 18. The upper ends of levers 7' and 8' are joined by a rod 19, and lever 10' is connected by a rod 20 to a bracket 22, secured to the truck-frame. A link 21 may be attached to the cylinder-lever as a connection for the hand-operated brake device.

When the pressure is applied to the brake-cylinder, as shown in Fig. 1 of the drawings, the cylinder-lever 3 is caused to turn about its fulcrum on rod 4 and move the upper end of lever 5 to the right. The power is then transmitted through the equalized system of lever-and-rod connections, as will be readily understood, applying all the brake-beams to the wheels with equal pressure.

The reaction or compression between the brake-cylinder and rod 4 and the bracket 22 at the end of the system is taken by a compression-strut 23, which is inserted between these parts of the truck-frame.

Instead of having a fixed fulcrum for the cylinder-lever 3 a rod 27 may be provided for connecting said lever with a corresponding lever 25 at the opposite end of the truck, as shown in the modification illustrated in Figs. 4, 5, and 6 of the drawings. This lever 25 may be pivotally mounted on a bracket or a slack-adjuster 26, secured to the truck-frame, and is connected at one end by a link 24 with the upper end of the lever 10'. By means of this construction the power is applied to levers 5 and 10' at the same time, the leverage being arranged to give the desired pressure on the brake-beams.

In many of the brake designs as heretofore used the brake-beams have been applied to but one side of the wheels, and it has been found that the lateral pressure on the journal or axle bearings due to the application of the brakes has caused these bearings to wear unevenly, making frequent repairs and renewals necessary. These objections are entirely overcome by the use of my improved design of brake-rigging, in which the brake-beams, with the shoes, are clasped to both sides of each pair of wheels with equal pressure, thus relieving the journal-bearings of any lateral pressure due to the application of the brakes.

Having now described my invention, what I claim as new, and desire to secure by Letters Patent, is—

1. A brake-rigging for six-wheeled trucks comprising brake-beams applied to both sides of each pair of wheels, equalizing-levers pivoted to the brake-beams, a brake-lever pivotally connected to one of the brake-beam levers, a second equalizing brake-lever having rod connections to the first brake-lever and to two of the brake-beam levers, and connecting-rods between the levers of each pair of brake-beams.

2. In a brake-rigging for six-wheeled trucks, the combination of brake-beams applied to both sides of each pair of wheels, levers pivoted to the brake-beams, a brake-cylinder, a cylinder-lever, an equalizing brake-lever connected to the cylinder-lever, connection from the brake-lever to three of the brake-beam levers, and connecting-rods between the brake-beam levers.

3. In a brake-rigging for six-wheeled trucks, the combination of brake-beams applied to both sides of each pair of wheels, levers pivoted to the brake-beams, connecting-rods between said levers, an equalizing-lever having connections to a plurality of the brake-beam levers, and means for applying power to the equalizing-lever.

4. In a brake-rigging for six-wheeled trucks, the combination of brake-beams applied to both sides of each pair of wheels, levers pivoted to said brake-beams, an equalizing-lever having a link connection with one of the brake-beam levers, intermediate connections between said equalizing-lever and two of the brake-beam levers, and means for applying power to the equalizing-lever.

5. In a brake-rigging for six-wheeled trucks, the combination of brake-beams applied to both sides of each pair of wheels, levers pivoted to the brake-beams, connecting-rods between said brake-beam levers, an equalizing-lever having connections to a plurality of the brake-beam levers, a brake-cylinder lever connected at one end with the equalizing-lever, a corresponding lever pivoted on the truck-frame and connected to one of the brake-beam levers, and a rod connecting the cylinder-lever with the corresponding lever.

In testimony whereof I have hereunto set my hand.

FREMONT P. LIVINGSTON.

Witnesses:
EDWARD A. WRIGHT,
JAS. B. MACDONALD.